E. MILLER.
GLASS WORKING MACHINE.
APPLICATION FILED NOV. 8, 1917.

1,350,375.

Patented Aug. 24, 1920.
12 SHEETS—SHEET 1.

Witness
Frank A. Sahle

Inventor
Edward Miller
By Hood & Schley
Attorneys

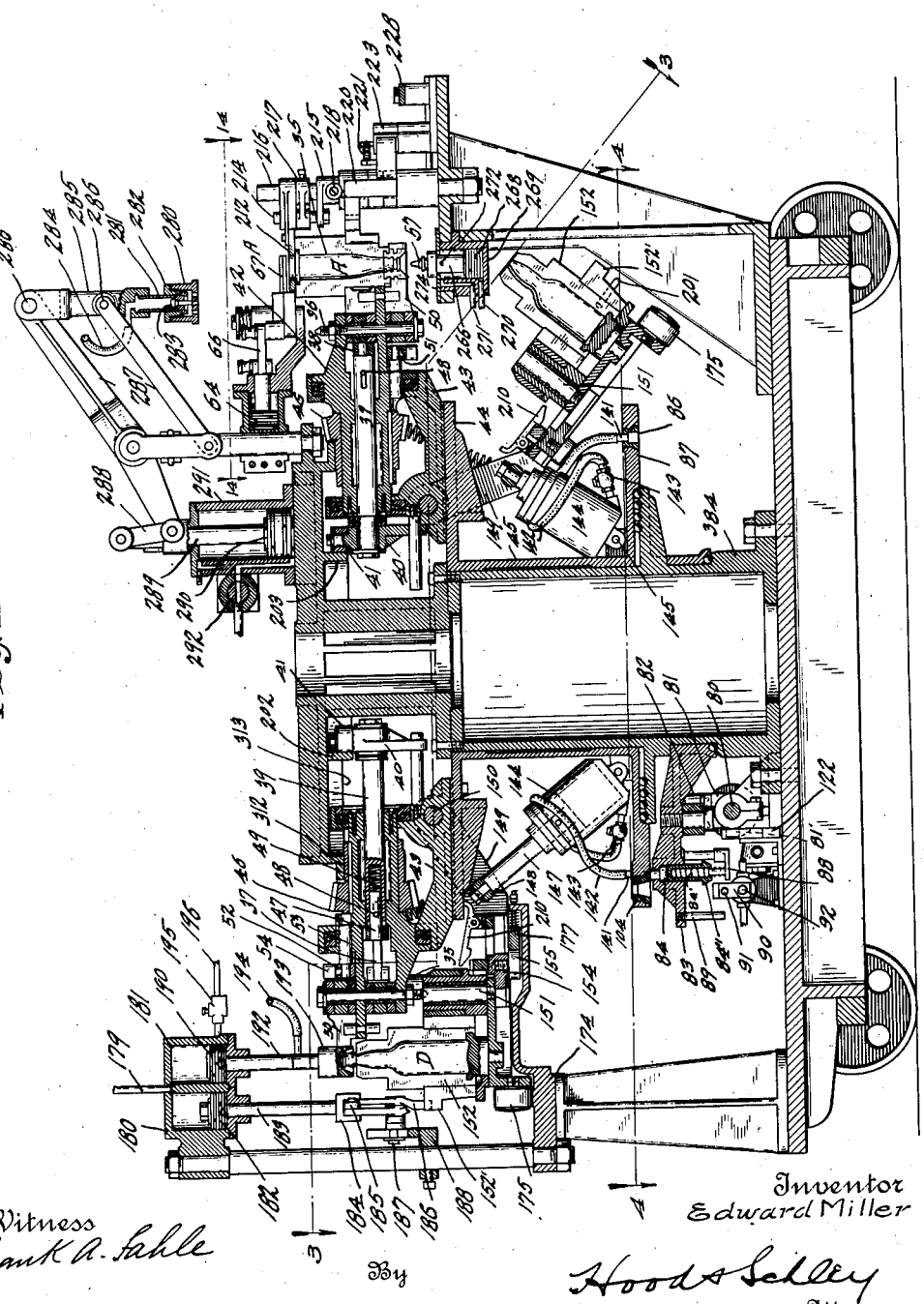

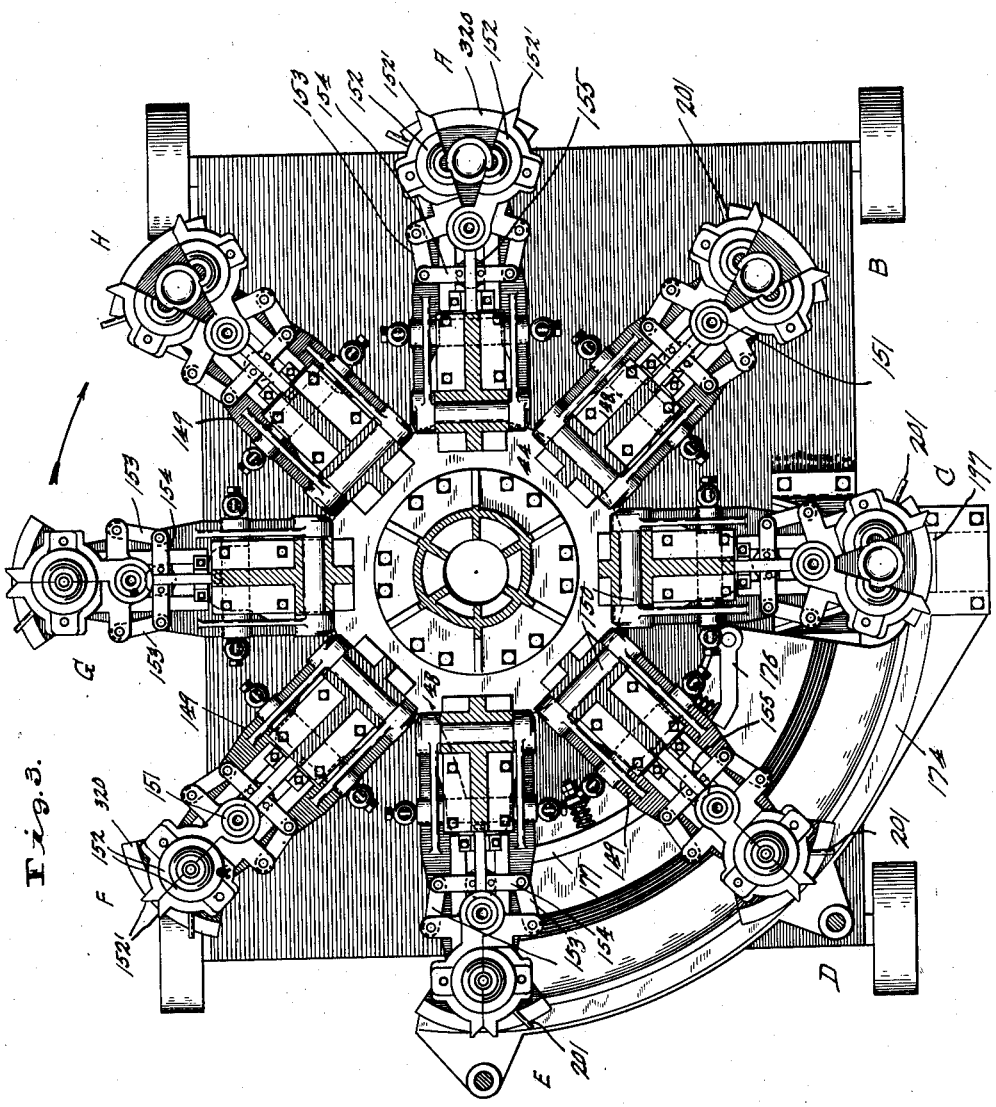

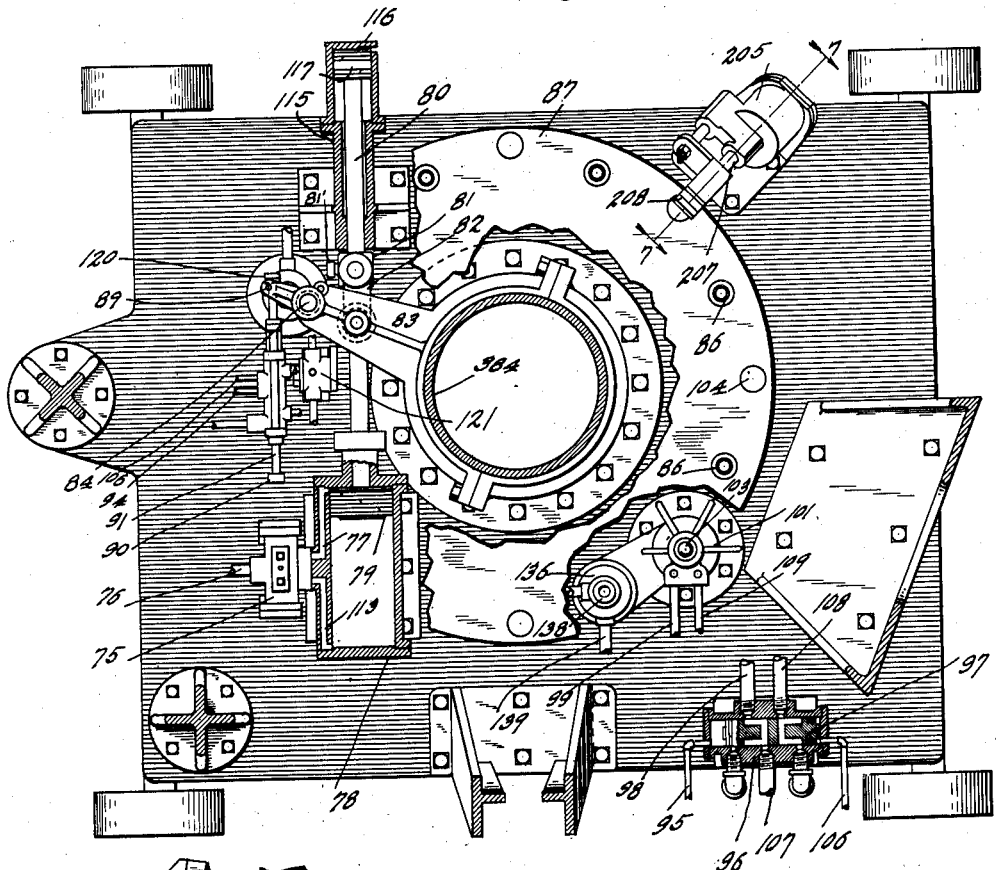

E. MILLER.
GLASS WORKING MACHINE.
APPLICATION FILED NOV. 8, 1917.

1,350,375.

Patented Aug. 24, 1920.
12 SHEETS—SHEET 5.

Witness
Frank A. Fahle

Inventor
Edward Miller,
By
Hood & Schley
Attorneys

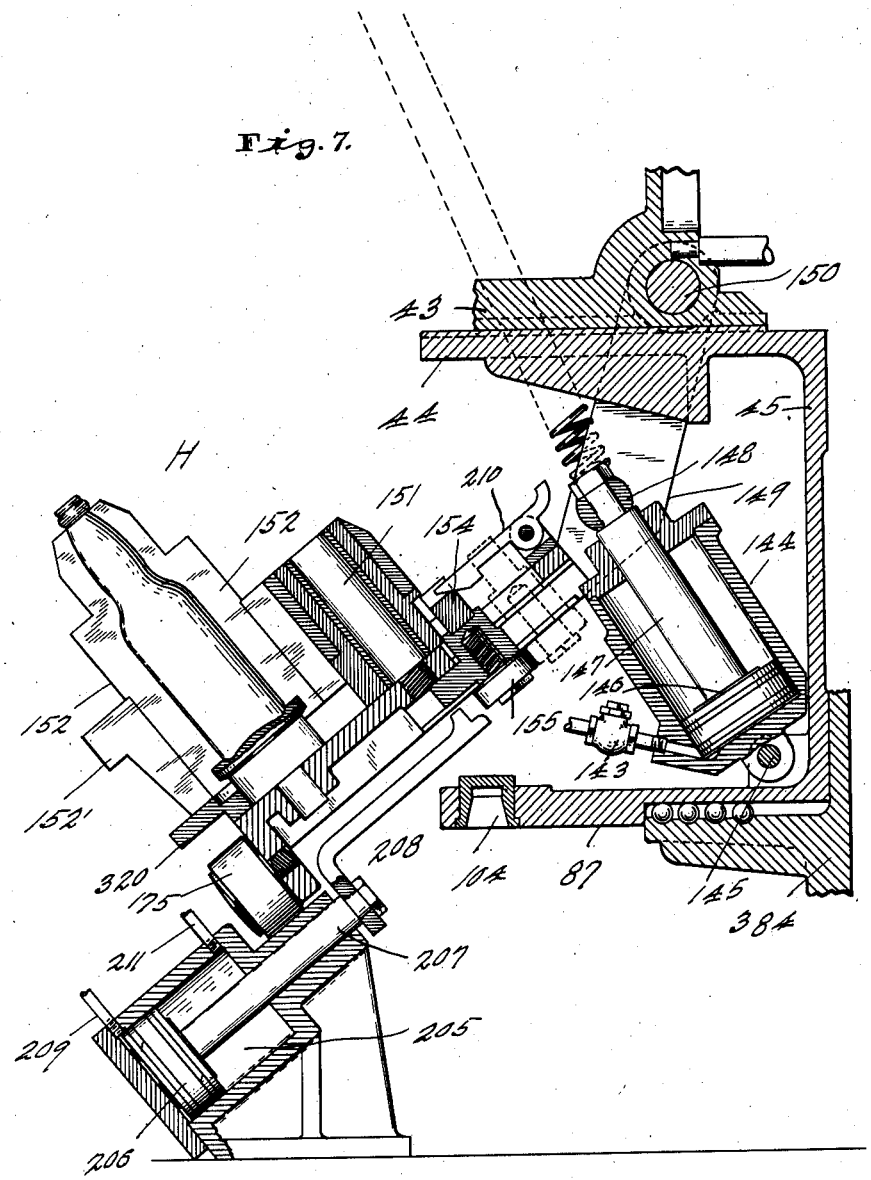

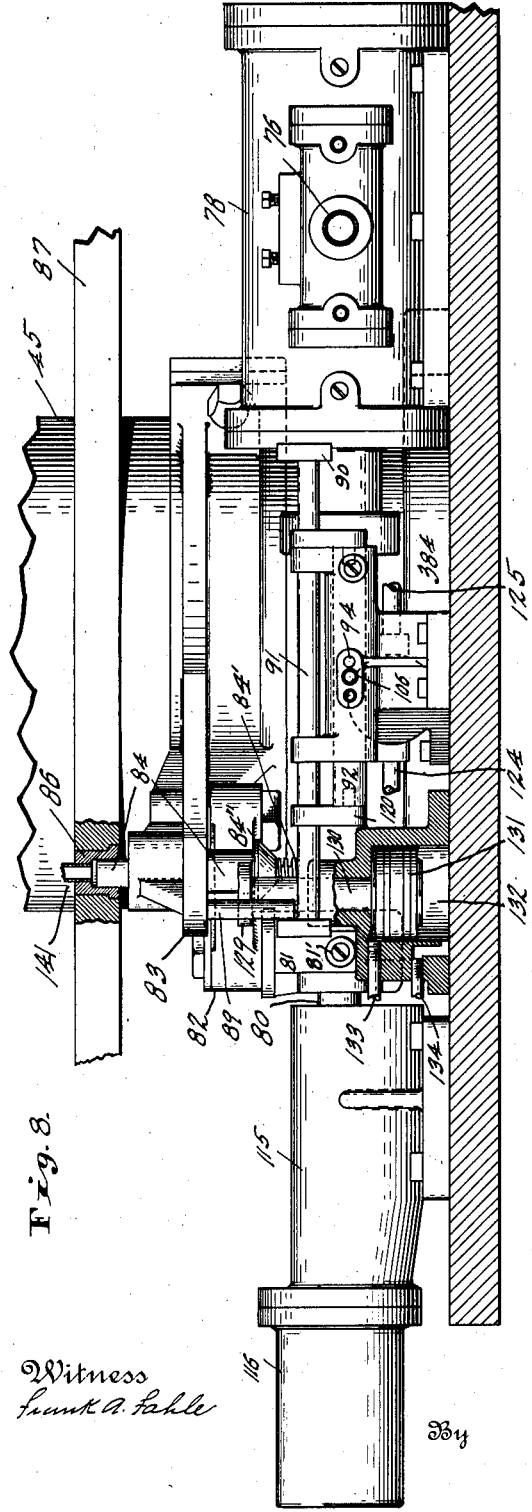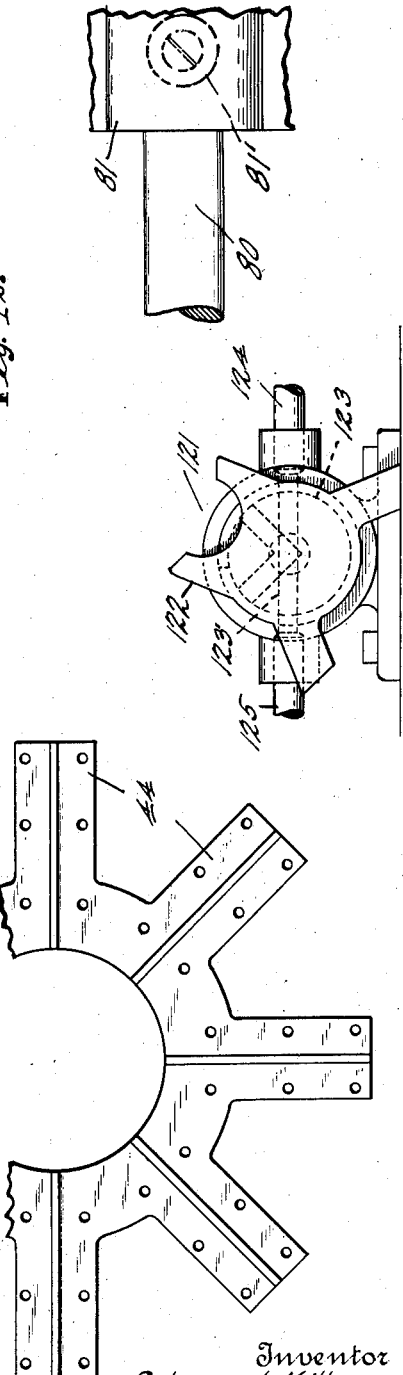

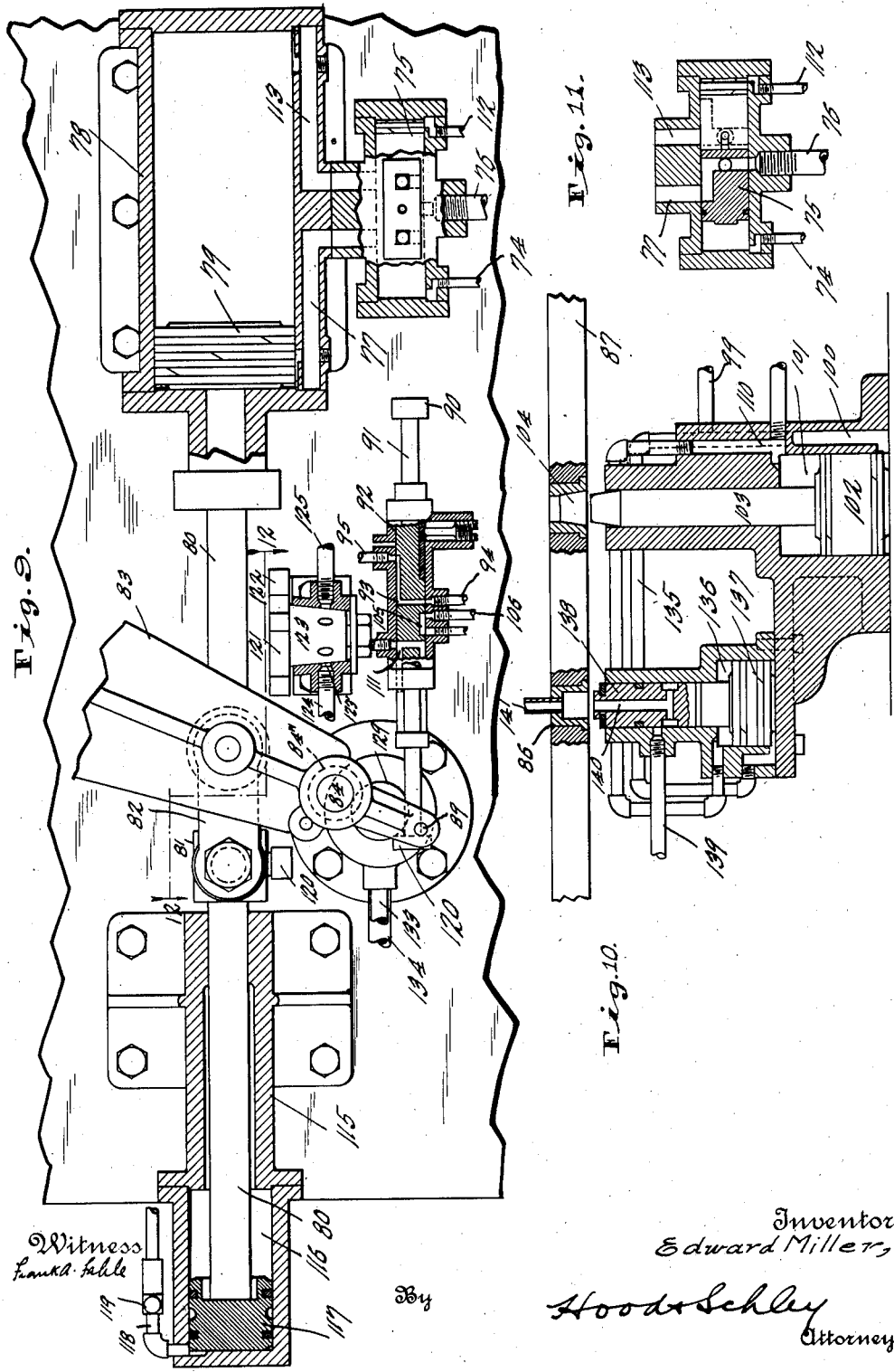

E. MILLER.
GLASS WORKING MACHINE.
APPLICATION FILED NOV. 8, 1917.
1,350,375.
Patented Aug. 24, 1920.
12 SHEETS—SHEET 9.
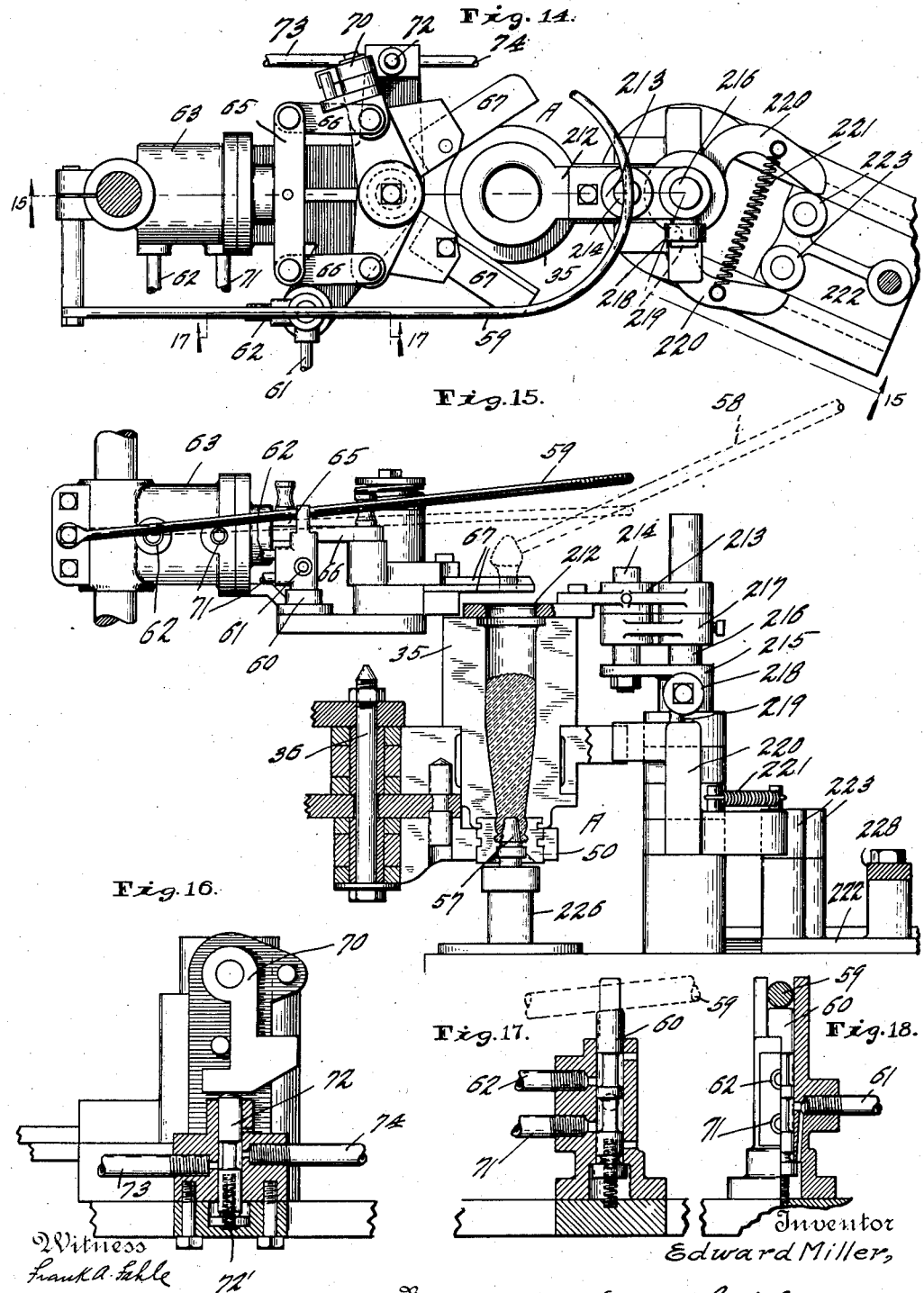

E. MILLER.
GLASS WORKING MACHINE.
APPLICATION FILED NOV. 8, 1917.

1,350,375. Patented Aug. 24, 1920.
12 SHEETS—SHEET 10.

Inventor
Edward Miller

Witness
Frank A. Sable

By Hood & Schley
Attorneys

E. MILLER.
GLASS WORKING MACHINE.
APPLICATION FILED NOV. 8, 1917.

1,350,375.

Patented Aug. 24, 1920.
12 SHEETS—SHEET 11.

Witness
Frank A. Fahle

Inventor
Edward Miller
By
Hood & Schley
Attorneys

E. MILLER.
GLASS WORKING MACHINE.
APPLICATION FILED NOV. 8, 1917.

1,350,375.

Patented Aug. 24, 1920.
12 SHEETS—SHEET 12.

Witness
Frank A. Fahle

Inventor
Edward Miller,
By
Hood & Schley
Attorneys

UNITED STATES PATENT OFFICE.

EDWARD MILLER, OF COLUMBUS, OHIO, ASSIGNOR TO CHAPMAN J. ROOT, OF TERRE HAUTE, INDIANA.

GLASS-WORKING MACHINE.

1,350,375.   Specification of Letters Patent.   Patented Aug. 24, 1920.

Application filed November 8, 1917. Serial No. 200,865.

*To all whom it may concern:*

Be it known that I, EDWARD MILLER, a citizen of the United States, residing at Columbus, in the county of Franklin and State of Ohio, have invented a new and useful Glass-Working Machine, of which the following is a specification.

The object of my invention is to produce a machine for the automatic production of hollow glass-ware by blowing process, the structure being designed to be under the control of the gathering boy up to the point where the charge of glass is deposited into the blank mold and being thereafter automatic and beyond the control of the gathering boy through the completion of the article.

The accompanying drawings illustrate my invention.

Figure 1:
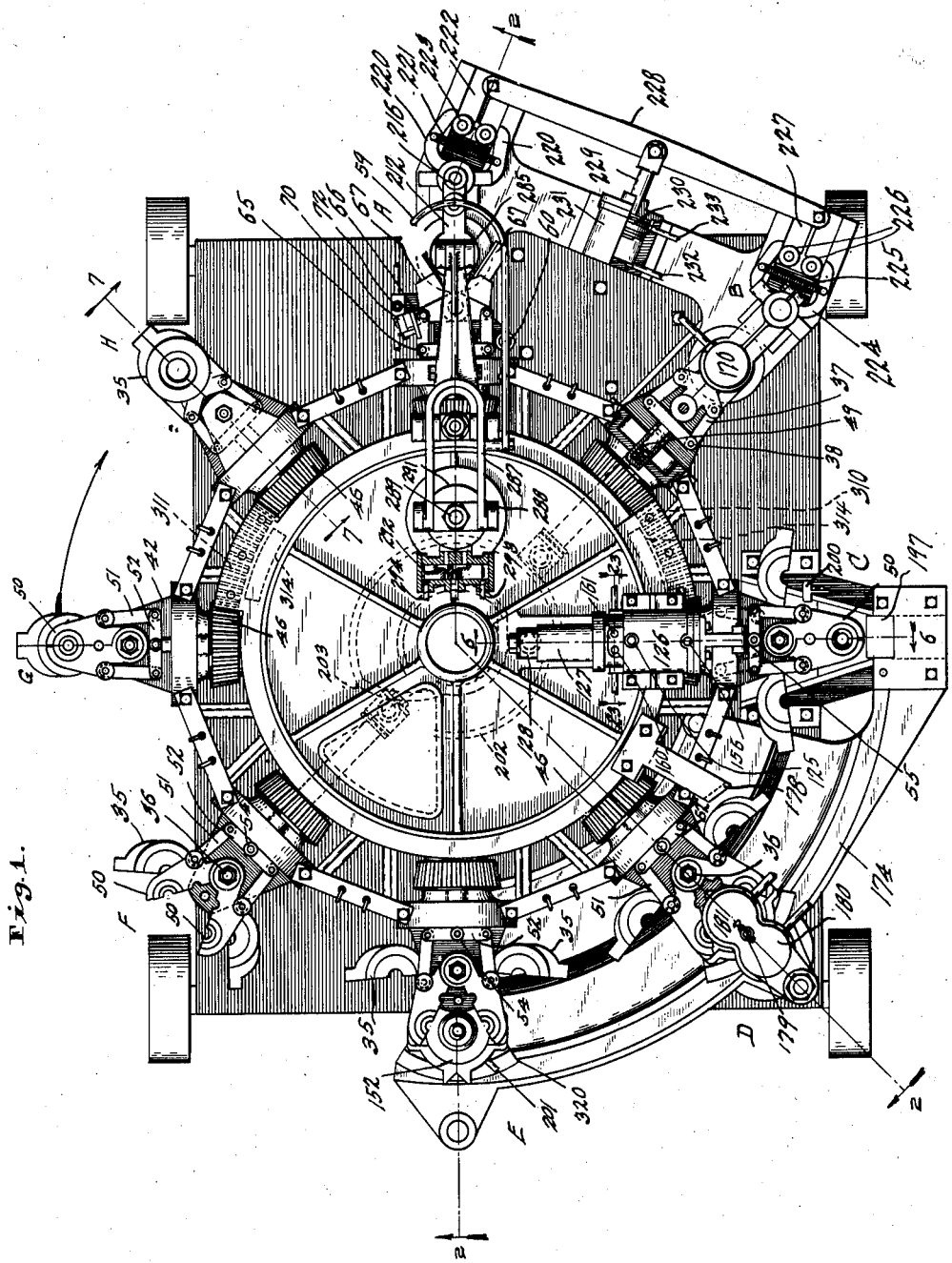

Figure 1 is a plan with the view plane displaced sufficiently to put valve 292 in section.

Fig. 2, a vertical section on line 2—2 of Fig. 1. In this view, two view planes at the left of Fig. 1 are brought into coincidence for convenience of illustration.

Fig. 3, a section on line 3—3 of Fig. 2.

Fig. 4, a section on line 4—4 of Fig. 2.

Fig. 5, a fragmentary plan of the blow-mold-closing cam and the blow-mold-carrying table.

Figure 6:
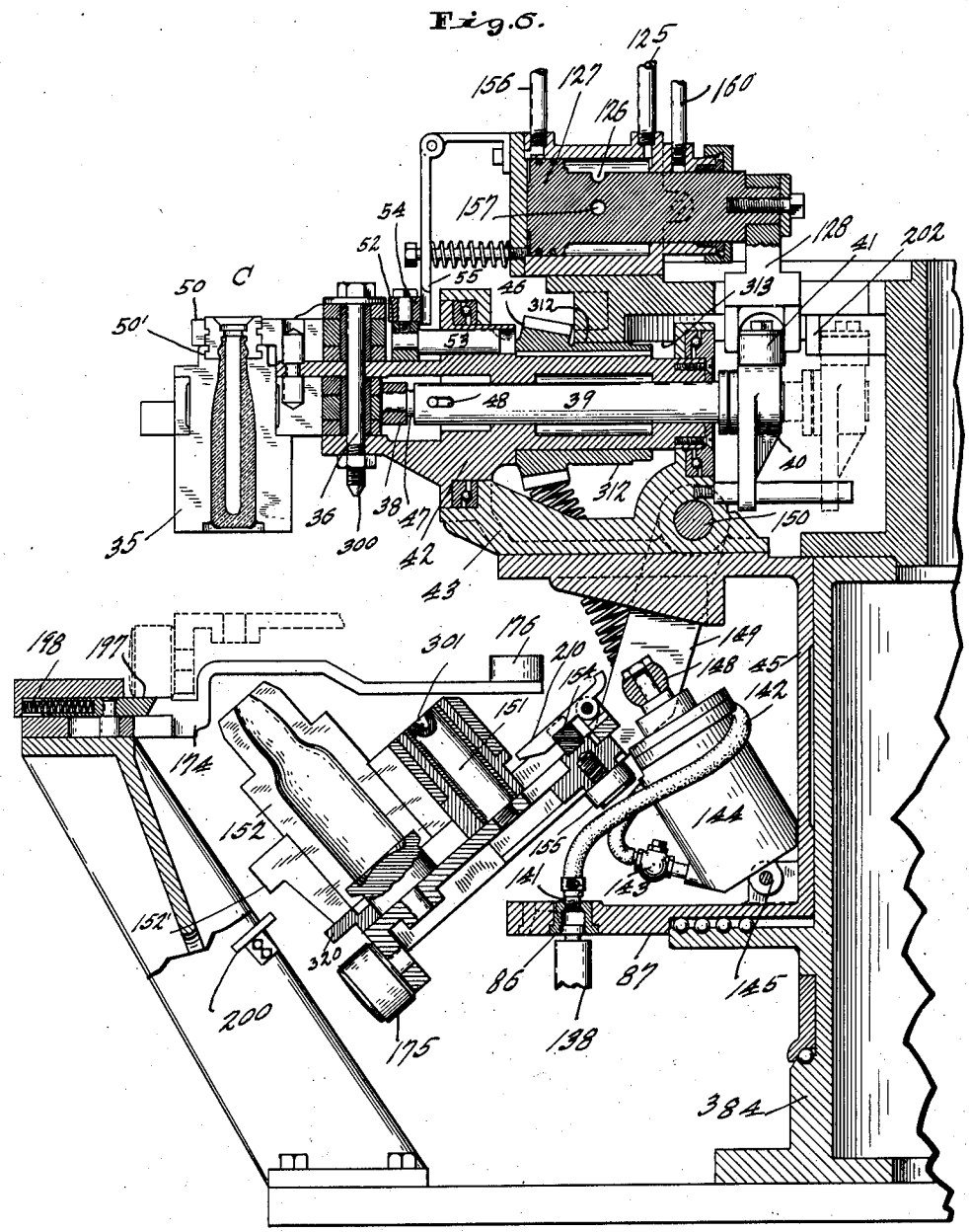

Fig. 6, a section on a larger scale, on line 6—6 of Fig. 1.

Fig. 7, a vertical section on line 7—7 of Fig. 4 with the blow mold brought into the same plane where the discharge of the finished product takes place.

Fig. 8, a fragmentary vertical elevation, in partial vertical section, of the table-driving mechanism.

Fig. 9, a plan in partial horizontal section of the parts shown in Fig. 8, with the mold table flange removed.

Fig. 10, a vertical sectional detail of the table-locking mechanism and blow mold-raising valve.

Fig. 11, a sectional detail of the valve for controlling the flow of air to the table-driving cylinder.

Fig. 12, a fragmentary side elevation of the valve for returning the piston which, on its opposite stroke, opens the blank mold, this view also including a fragmentary portion of the table-operating piston rod.

Fig. 13, a fragmentary plan of a portion of the spider which carries the various molds.

Fig. 14, a plan of the shearing mechanism and immediately associated parts.

Fig. 15, a vertical section on line 15—15 of Fig. 14.

Fig. 16, a detail of the main trip valve, with the valve body in vertical section.

Fig. 17, a sectional detail of the shear-control valve, on line 17—17 of Fig. 14.

Fig. 18, a fragmentary section of the parts shown in Fig. 17, on a plane at right angles to the plane of Fig. 17.

Figure 19:
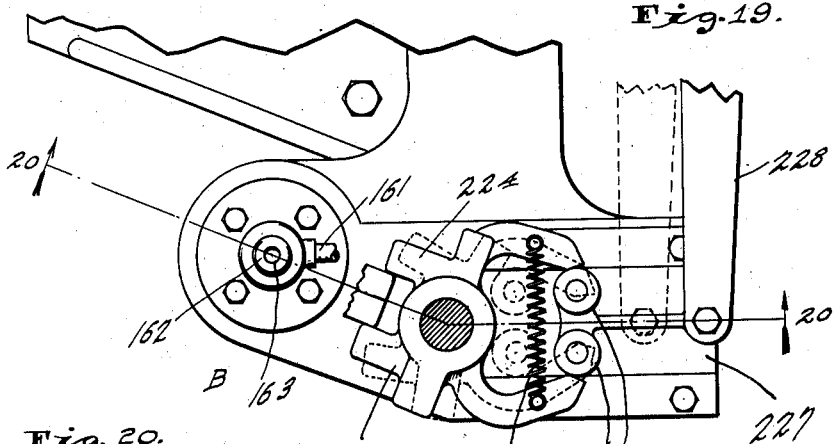

Fig. 19, a plan in partial horizontal section (line 19—19 of Fig. 20) of one of the blank mold clamps and the puff-back head.

Figure 20:
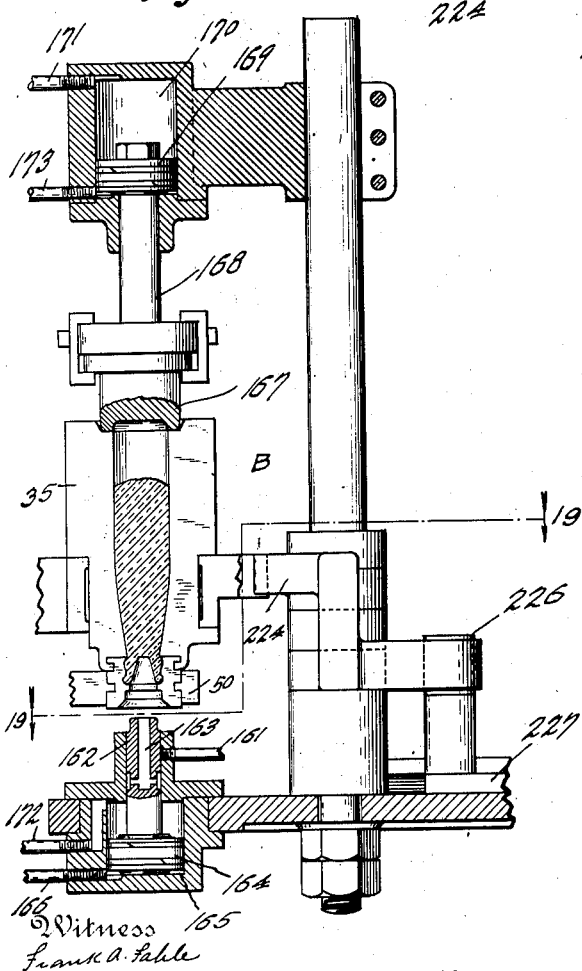

Fig. 20, a section on line 20—20 of Fig. 19, and also showing the blank mold baffle plate and associated parts.

Figure 21:
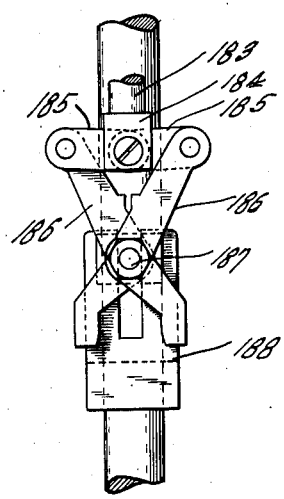

Fig. 21, a fragmentary elevation of the blow mold clamp.

Figure 22:
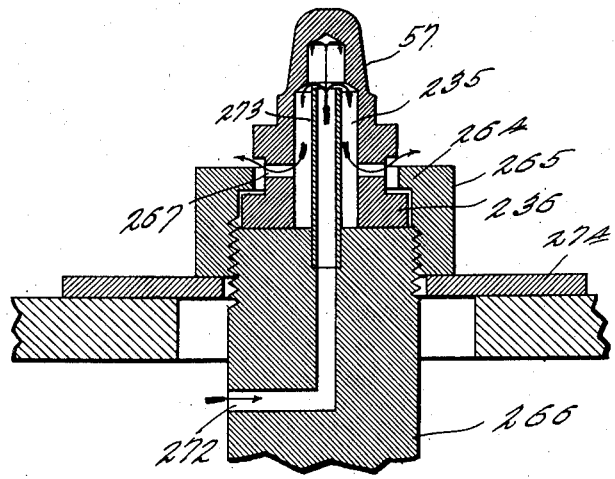

Fig. 22, a sectional detail of the neck-forming nipple and its operating parts.

Figure 23:
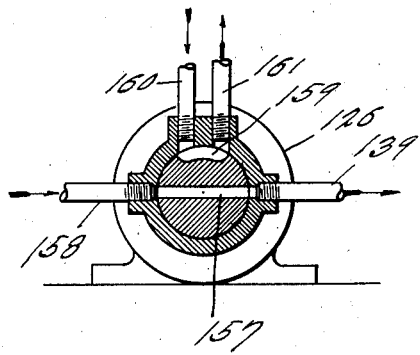

Fig. 23, a fragmentary section on line 23—23 of Fig. 1, showing some of the parts associated with the blank mold operating piston.

Figure 24:
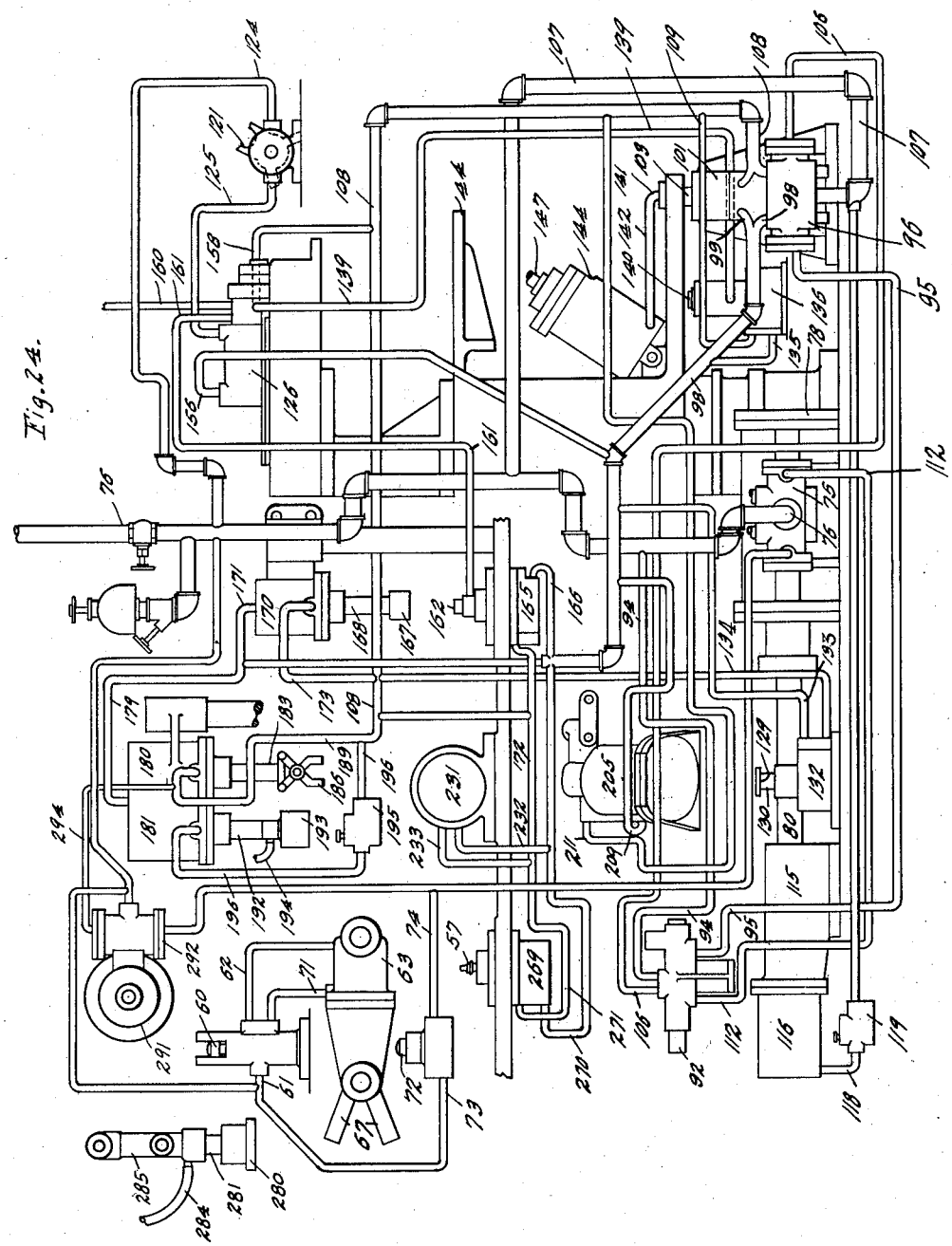

Fig. 24 is a diagram of the piping and associated parts.

Referring to Fig. 1, the machine is shown as provided with eight mold sections which are of identical construction and for convenience of description, they will be referred to at various times as being in the following positions:—

A, filling position.

B, puff-back position.

C, blank-opening and mold-raising position.

D, final blowing position.

E, glass setting position.

F, lowered position, the blow mold with the finished product within it being lowered at this time and the blank mold started on its closing movement.

G, an intermediate position preliminary to reversion of the blank mold, the completed product being still in the lowered and closed blow mold.

H, a reverted position of the blank mold and discharge position of the blow mold.

Referring first to Figs. 2 and 15, the blank mold comprises a pair of coöperating mold sections 35, 35 which are of the usual form, pivotally supported upon a pin 36 and operated by means of links 37 and cross head 38. Cross head 38 is carried by a rod 39 provided at its inner end with a head 40 having a roller 41 adapted to be engaged by cams, to which reference will be made hereafter. The rod 39 is axially reciprocable in a rotating mold carrying head 42 which is journaled in suitable bearings in a bracket 43 carried by one arm of the spider 44 which forms part of the rotating sleeve 45 which will be in general referred to as the rotating table. Head 42 carries the pivot pin 36 and the associated parts and is provided with a bevel gear 46 by means of which it may be rotated at proper times. The cross head 38 is not directly carried by pin 39 but, instead, is carried by a supplemental pin 47 which is mounted within rod 39 and connected thereto by a pin and slot connection 48 (Fig. 2) with a backing spring 49, the arrangement being such that spring 49 allows for variations due to differences in temperature.

Pin 36 also forms the pivotal support of the neck ring sections 50, 50 which are of the usual form, operated by links 51, 51 and cross head 52. Cross head 52 is carried by a guide pin 53 and is provided with a roller 54. The neck ring mold sections have the usual coöperative connection 50' with blank mold sections and are held closed during a short interval when the blank mold is being withdrawn and the blow mold is being brought to position, by the spring-pressed cam 55.

Referring back to Figs. 2 and 15, and assuming the neck-forming nipple 57, shown in Fig. 2 to be in the position shown in Fig. 15, the operator will deposit a suitable charge of glass in the inverted blank mold by any suitable means, such, for instance, as punty 58, and as soon as the proper quantity has accumulated in the mold, he will lower the punty so as to depress the main control lever 59. The depression of this lever will depress valve 60 (Fig. 17) and allow air to flow from pipe 61 (Fig. 18) to pipe 62 which delivers air to cylinder 63 and causes piston 64 to move outwardly so as to act through cross head 65 and links 66, to bring the shear blades 67, 67 together to sever the glass from the punty. One of the shear-blade-carrying arms carries a single acting pawl cam 70 which, on the cutting movement of the shears, is inactive, but as soon as lever 59 is released so as to permit the air from pipe 61 to flow through pipe 71 to the opposite end of cylinder 63 and thus return the shear blades to normal open position, acts upon the valve pin 72 to depress it to the position shown in Fig. 16 and thus establish a connection between pipe 73 and pipe 74, this pin 72 being depressed against the action of a spring 72. Until this release of lever 59 takes place, there is no movement of any of the parts of the machine, so that the starting of the machine is entirely under the control of the operator. As soon as lever 59 is released, however, the further operations of the machine become entirely automatic and beyond the control of the operator, this resulting from the depression of the valve 72.

Supply of air to pipe 74 delivers air to one end of the cylinder of the valve 75 and shifts said valve to the right in Fig. 11, so as to establish a connection between pipe 76, in which a high pressure of air is maintained, and passage 77, which leads to the lefthand end of cylinder 78 (Fig. 9), in which is mounted piston 79. Piston 79 is provided with a piston rod 80, upon which is adjustably secured a cross head 81. Attached to cross head 81 is a link 82 connected to the main table-operating arm 83, which is journaled upon the pedestal 384, upon which the sleeve 45 is also journaled. As piston 79 moves to the right (Fig. 9), it swings lever 83 to the right, moving said lever back to a position where it will engage the main table for a forwarding operation, and as it reaches the extreme of its stroke, in this direction, a locking pin 84, carried by the arm, drops into one of the series of bushings 86 carried by flange 87 of the main table, there being one of these bushings 86 for each mold unit. The pin 84 is normally urged upwardly by spring 84' which is supported by an arm 88. As arm 83 reaches the extreme of its initial stroke, a pin 89, carried by the arm, engages a collar 90 on one end of valve stem 91 and shifts valve 92 to the right from the position shown in Fig. 9.

In the normal position of valve 92, as shown in Fig. 9, its port forms a communication between the supply pipe 94 and pipe 95 which leads to the main control valve casing 96, holding the main control valve 97 normally in one extreme of its position, at which time a communication is established between pipe 107 through pipe 98 and pipe 99 with a passage 100 which leads to the lower end of a cylinder 101, so as to normally hold piston 102 in its upper position and thus hold the locking pin 103 in one of the lock bushings 104 of flange 87.

The shifting of valve stem 91 to the right in Fig. 9, serves to establish a connection through port 105 between pipe 94 and pipe 106, which causes valve 97 to move from its normal position, and thus establish a connection between the constant pressure supply line 107 and pipe 108 which is connected to pipe 109. Pipe 109 communicates with a passage 110 which delivers air to the upper end of cylinder 101 and retracts the lock pin 103. As soon as piston 79 has reached the extreme of its righthand movement (Fig. 9), and valve stem 91 has been shifted by the action of pin 89, a passage 111 of valve 92 establishes a connection between the supply pipe 94 and pipe 112, which is connected to the righthand end of the casing of valve 75, and thus shifts said valve so as to establish communication between the supply pipe 76 and a passage 113 which leads to the righthand end of cylinder 78 and thus causes a forwarding movement of the main mold table. In order that this forwarding movement may be properly cushioned, I extend the piston rod 80 into a casing 115 which carries at its end a cylinder 116 in which is mounted a piston 117 which is normally urged to the right by a constant air pressure supplied through pipe 118, provided with an adjustable by-pass valve 119, the arrangement being such that a comparatively light supply of air pressure to the lefthand end of cylinder 116 will be built up upon the return movement of piston 117 caused by the action of piston rod 80, in such manner as to cushion the forwarding movement of piston 79.

When arm 83 reaches the position shown in Fig. 9, pin 89 will engage a collar 120 on the valve stem 91, and shift said valve 92 to the position shown in Fig. 9.

As rod 80 moves to the left, it brings a roller 81' (which is carried by cross head 81) into the notch 121 of a valve-operating head 122 carried by the plug valve 123, and shifts it to the position shown in Fig. 12, thus establishing, through the diametrical passage 123', a communication between a pressure supply pipe 124 and a pipe 125 which leads to the right hand end of a cylinder 126 (Fig. 6) and thus causes piston 127 to move to its normal position, shown in Fig. 6. Piston 127 carries at its outer end a yoke 128 which is adapted to receive in succession the rollers 41.

The movement of arm 83 to the position shown in Fig. 9 also brings a shoulder 84'', of pin 84, beneath a flange 129 (Fig. 8) of piston rod 130 carried by a piston 131 mounted in cylinder 132. It will be recalled that movement of arm 83 to the position shown in Fig. 9 has resulted in a movement of valve 97 to the left. This movement of valve 97 to the left will supply air through pipe 98 to a pipe 133 which delivers to the upper end of cylinder 132, and thus causes flange 129 to pull the locking pin 84 downwardly out of bushing 86. Shortly prior to this movement, it will be recalled, locking pin 102 has been moved upwardly into its bushing 104 by air received from pipe 98. The return of piston 131 to the position shown in Fig. 8 is accomplished by air received through pipe 134, which receives its air from pipe 108, this return taking place when the arm 83 is shifted to the right (Fig. 9). The movement of valve 97 to the left also results in the delivery of air through pipe 98 to a pipe 135 which leads to the lower end of a cylinder 136, and drives piston 137 upwardly so as to project its tubular stem 138 into one of the bushings 86 and thus establish an air connection between the high pressure supply line 139 and passage 140 of stem 138. Air delivered through passage 140 reaches pipe 141. There is one of these pipes for each bushing 86 and attached to each of these pipes is a flexible pipe 142 which leads through a control-leakage check 143 to the lower end of a cylinder 144 (Fig. 7) which is pivotally supported at 145 upon the main table. There is one of these cylinders 145 for each blow unit and it carries a piston 146 provided with a piston rod 147 connected to a cross arm 148 which is pivoted in the supporting yoke 149 which carries the blow mold. Yoke 149 is pivoted at 150 to bracket 43 and carries a pin 151 upon which are pivoted the two mating members 152, 152 forming the blow mold. These blow mold members are of the usual form and operated by links 153 and cross head 154 which carries a roller 155. The movement of valve 97 to the left also supplies air through pipe 98 and pipe 156 to the lefthand end of cylinder 126, where the pressure acts upon an area of piston 127 which is twice the area which is acted upon by pressure within the righthand end of cylinder 126. The pressure within the righthand end of cylinder 126 is acting at the time it becomes necessary to shift piston 127 to the right, because valve 123 is not shifted to its exhaust position until arm 83 moves to the right (Fig. 9).

Movement of piston 127 to the right, as a result of air supplied through pipe 156, operates through yoke 128, upon roller 41 of that blank mold which is in position C, just as soon as the table comes to a stop after its forwarding movement, and this movement of piston 127 to the right also brings a diametrical port 157 into position to establish communication between a high pressure line 158 and pipe 139 which, as previously explained, results in an upward movement of that blow mold unit which is at position C, the blow mold thus coming up into position to receive the parison as the blank mold is opened. The blow mold, however, does not close about the parison until the next forwarding movement of the table.

The movement of piston 127 to the right also brings a port 159 into position to establish communication between a low pressure supply line 160, and a pipe 161 (Fig. 20) which supplies the air for the "puff-back."

The puff-back nipple 162 is arranged at station B and is provided with a central passage 163 adapted, when the puff-back nipple is raised, to establish communication with pipe 161. Nipple 162 is carried by a piston 164 in the cylinder 165 and, as the table is brought to rest after its forwarding movement, and valve 97 has shifted to the left so as to establish an air connection with pipe 98, pipe 98 will deliver air to a pipe 166 which will cause piston 165 to rise.

Also located at station B is the baffle plate or cover 167, which is carried by piston rod 168 carried by a piston 169 mounted in cylinder 170. When valve 97 is shifted to the left, the air from pipe 98 is also delivered to pipe 171 which serves to move piston 169 downwardly and bring cover 167 over the upper end of the inverted blank mold at station B, this operation taking place simultaneously with the upward movement of the puff-back nipple 162 so that the blank may be blown immediately after piston 127 has moved to the right (Fig. 6). Movement of the valve 97 to the right (as already described) serves to supply air through pipe 108 to pipe 172 to retract the puff-back nipple and through pipe 173 to raise the cover plate 167.

The movement of valve 97 to the left also serves to clamp the blow mold and bring the blow head into engagement with the blow mold at station D.

The blow mold at station D is held in its elevated position by a platform 174 (Figs. 2 and 5) upon which roller 175 has been brought by the previous forwarding movement of the table, said roller 175 being carried by the blow mold yoke 149 and roller 155, during that forwarding movement of the table, has come into contact with the spring pressed cams 176 and 177 which are arranged upon table 174 and serve to shift cross head 154 so as to close the blow mold sections 152 around the parison which, up to that time, has been supported by the neck ring 47. At about the time roller 155 reaches the highest point of cam 176, roller 54 of cross head 52, comes into engagement with a cam 178 (Fig. 1) which operates to shift cross head 52 inwardly and thus open the neck ring sections. This opening of the neck ring sections takes place immediately following the closing of the blow mold sections, so that the chilled neck of the bottle is free from the neck ring before the final blowing operation takes place. This serves to avoid a very considerable amount of checking and cracking of necks which is found to take place if the blow head is brought into contact with the neck ring and the blowing operation takes place through the neck ring instead of directly through the neck of the article.

As previously stated, the movement of valve 97 to the left supplies air for locking the blow mold and operating the blow head at station D. This is accomplished by forcing air through pipe 98 to a pipe 179 which leads to the upper ends of two cylinders 180—181 arranged vertically at station D. In cylinder 180 is a piston 182 provided with a piston rod 183 carrying a yoke 184 at its lower end (Fig. 21). Pivoted in yoke 184 are two oppositely extending toggle levers 185, 185 which are connected at their outer ends to the upper arms of a pair of clamping levers 186 pivoted upon a vertically adjustable pivot pin 187 mounted in a vertically adjustable fork 188. The lower ends of clamping levers 186 are arranged to engage and clamp the usual lugs 152' on the blow molds. The release of clamps 186 is accomplished by a supply of air through pipe 189 which receives its air from pipe 108.

Mounted in cylinder 181 is a piston 190 provided with a piston rod 192 which carries at its lower end a blow head 193 of common form receiving blow air from pipe 194. The details of this blow head form no part of my present invention and it is sufficient to say that it is of that common type, where a slight relative movement of the parts due to contact with the article to be blown, serves to permit escape of the blow air into the article. As previously stated, air is supplied to the upper end of cylinder 181 through pipe 179. It is desirable that the downward movement of piston 190 be cushioned so that the blow head does not come sharply into contact with the neck of the article to be blown and for that purpose I mount a check or by-pass 195 in the pipe 196 which supplies air for producing the upward movement of piston 190, pipe 196 receiving its air from pipe 108. The by-pass 195 is of such character that the exhaust from the lower end of cylinder 181 is a restricted one and this insures a soft application of the blow head to the article.

At the time the blow mold is thrown up to position to envelop the parison, at position C, it is desirable that it be supported by the platform 174, and, therefore, I provide, at the receiving end of platform 174, a latch 197 which is held normally extended by a spring 198, said latch being placed in the path of upward movement of roller 175 and on a level with the platform, as clearly shown in Figs. 5 and 6.

It sometimes occurs that the blow mold is not properly opened at the discharge station H (Fig. 3) and in order to prevent a raising of this undischarged blow mold when it again returns to position C, I provide a stop latch 200 at station C and each of the blow molds is provided with a finger 201 which, if the blow mold sections be not opened, will lie immediately beneath stop finger 200 at the time air is supplied to the blow mold lifting cylinder and thus serve to prevent the lifting of the blow mold yoke.

As previously stated, the blank mold sections are separated by an axial movement of rod 39 inwardly as a result of movement of piston 127 to the right, in Fig. 6. This movement is accomplished promptly following each advancing step of the table, and shortly thereafter the table is again advanced. It is necessary that the blank mold sections be kept open for a considerable period, while the mold is advancing from position C to position E, and I, therefore, provide a segmental cam 202 (Fig. 6, and dotted lines, Fig. 1) inside of which roller 41 is carried by the advancing movement of the table. Just after position E is reached, cam 202 is discontinued and at this point I provide a cam 203 (Fig. 2, and dotted lines Fig. 1) which serves to project rod 39 outwardly while the mold is advancing from position E through position F to position G and from that position forward until position E is again reached, to act upon roller 41 to keep the blank mold sections closed.

The air supply through pipe 142 is discontinued as soon as the table starts upon its next forward movement, and the blow mold yoke, as previously stated, is held in elevated position, from position C through position E, by the platform 174. Just after position E is reached, roller 175 passes beyond platform 174 and the blow mold yoke immediately drops but the air within the lower end of cylinder 144 being retained to some extent by the leaking check 143, serves as a cushion which permits the slow descent of the blow mold yoke between the positions E and H.

At the position H, I arrange a cylinder 205 (Fig. 7) within which is mounted a piston 206 having a piston rod 207 provided with a finger 208 adapted to engage roller 155, and as the table comes to rest, air from pipe 98 is delivered to pipe 209 so as to drive piston 206 upwardly and cause finger 208 to engage roller 155 and shift cross head 154 to the position shown in dotted lines in Fig. 7, latch 210 thereupon engaging the cross head and holding the blow mold parts in open position. Piston 206 is returned to its normal position by means of air supplied through pipe 211 received from pipe 108 when valve 97 is shifted to the right at the time arm 83 moves to the right to engage the table for a forwarding motion. Catch 210 is automatically withdrawn from active position at the time the blow mold yoke is swung upwardly, by having its tail come into contact with the adjacent arm of the spider 44, as illustrated in Fig. 2.

Returning now to the filling position, as illustrated in Fig. 2, it is advisable, in order that the glass be properly delivered into the blank mold, to provide a feeding funnel or guard plate 212 which is carried by a collar 213 secured to a vertical pin 214 which is carried by an arm 215 vertically slidable upon a pin or guide-post 216. Secured to post 216 and vertically adjustable thereon, is a collar 217 through which pin 214 passes. Arm 215 carries a roller 218 which is adapted to be engaged by a lug 219 (Fig. 15, and dotted lines Fig. 14) carried by one of the blank mold clamping arms 220, 220, the arrangement being such that when the clamping arms are withdrawn from clamping engagement with the lugs of the blank mold, pin 219 will pass beneath roller 218 and serve to lift plate 212 from the blank mold in order to give sufficient clearance.

The blank mold clamping arms 220 are pivoted upon post 216 and are normally urged toward unclamping position by a spring 221. Between the outer arms of these blank mold clamps, I arrange a sliding head 222 having rollers 223 engaging the clamping arms. The clamping arms 220 are arranged adjacent station A and as it is necessary to clamp the blank mold sections together during the time of formation of the parison, it is also necessary to provide blank mold clamps 224 at station B. These clamps are provided with a spring 225 like spring 221 and are operated by rollers 226 carried by a slide 227. The slides 222 and 227 are connected together by a beam 228 which at its middle is attached to a piston rod 229 carried by a piston 230, and cylinder 231. Air is supplied to cylinder 231 through pipe 232 which gets its air from pipe 98 and is also supplied at its other end with air through pipe 233 which gets its air from pipe 108.

The nipple 57 is provided in order to form an initial blow opening in the neck of the blank and, as previously stated, is in the position shown in Fig. 15 at the time of introduction of the molten glass. This nipple is illustrated in Fig. 22. At is upper end, nipple 57 is formed to properly coöperate with the neck ring and is provided with an internal chamber 235. At its lower end it is provided with a circumferential flange 236 which lies beneath an inwardly projecting flange 264 of nut 265 which is threaded upon the upper end of piston rod 266. The association of nipple 57 with nut 265 is such that the nipple has some freedom of lateral play in order that it may properly center in each of the neck rings even though there be some variation in positioning of successive neck rings at position A, and near its lower end the nipple is provided with passages 267 which form outlets for chamber 235. Rod 266 is carried by a piston 268 (Fig. 2) mounted in a cylinder 269. Piston 268 is moved upwardly by air supplied through pipe 270 which receives air from pipe 98; and is moved downwardly by air supplied through pipe 271 which receives its air from pipe 108. It is quite desirable that nipple 57 be cooled and for this purpose I provide an L-shaped passage 272 in piston rod 266 and at the upper end of this passage, mount a tube 273 which projects upwardly well into nipple 57. The lower end or foot of the L-shaped passage 272 emerges from the side of piston rod 266 and is so arranged as to pass beneath the cylinder head or cover 274 of cylinder 268 when piston 269 is depressed, the arrangement being such that air flowing into the upper end of cylinder 269 will, at least to some extent, pass upwardly through passage 272 and tube 273 into the interior of nipple 57 and out through passages 267 so as to keep the nipple properly cooled.

Immediately following the charging of the blank mold at position A, it is desirable that the glass within the mold be compacted by pressure applied to the upper end of the molten mass of glass. For this purpose, I provide the compacting pressure head 280 which is formed at its lower end to cover the upper end of the blank mold by coming down upon the guard plate 212. The head 280 is slidably mounted upon a tube 281 provided with an internal valve seat 282 upon which normally rests a valve 283 carried by head 280, the weight of head 280 serving to keep the valve seated and thus serving to prevent outflow of air which is maintained constantly within the interior of tube 281 through a supply pipe 284. Tube 281 is carried by a link 285 which is supported by pivotal connections 286 with a pair of parallel levers 287, one of which is connected by a link 288 with a piston rod 289 carried by piston 290 within cylinder 291. Flow of air to and from cylinder 291 is controlled by a valve 292 (Fig. 1). Valve 292 is operated in one direction by pressure received through pipe 293 which gets its air from pipe 74 so that, as soon as pin 72 is depressed, air will be furnished to the lower end of cylinder 291 so as to drive head 280 down upon guard plate 212 and subject the glass within the blank mold to a compacting pressure. Air is supplied to operate valve 292 in the opposite direction through pipe 294 which receives its air from pipe 108.

In order to properly center the blow mold with relation to the neck ring, each pin 36 is provided with a conical end 300 and the upper end of each pin 151 is provided with a correspondingly shaped socket 301 so that when the blow mold yoke is thrown up to the position shown in Fig. 2, socket 301 will embrace end 300 and not only properly center the blow mold with relation to the parison, but also prevent any upward cocking of the yoke by the action of cams 176 and 177 upon roller 155.

The blank mold is in an inverted position, i. e., with the neck ring at the bottom, at station A, in order to receive the charge of glass, and is in a similar position at station B in order that the parison may be formed in an inverted position. When the parts leave station B, gear 46 comes into engagement with a segmental rack 310 (Fig. 1) which is of sufficient extent to revert the mold during the time it is passing from station B to station C. The blank mold is inverted by a similar engagement of gear 46 with a segmental rack 311 between stations G and H. In order that the sleeve 45 may be held against rotation, except as gears 46 come into contact with the segments 310—311, the hub of each gear 46 is provided at diametrically opposite points with flattened surfaces 312 (Fig. 6) of sufficient lateral extent to insure stability and these flattened surfaces coact with the under surface of a circular flange 313 (Fig. 6) in an ordinary manner, except adjacent each segment 310—311, where said surfaces are cut away, as indicated by dotted lines 314 (Fig. 1) adjacent the segments 310—311.

It will be seen from the above description that the only operation of the machine required on the part of the operator is a depression and release of the lever 59; that the depression of lever 59 causes an operation only of the shears and that the machine remains under the control of the operator until he releases lever 59, whereupon the returning movement of the shears, acting upon valve 72, actuates valve 97 and retracts the compacting head, whereupon all of the other movements of the machine occur in proper sequence as a result of the actuation of valve 97 without further tension by the operator so that he may be free to return to the furnace for a new charge of glass.

In the operation of the blow molds, there is a tendency to bend, or overturn the pin 151, and in order to relieve this pin of the weight of the molds when they are in closed position, I provide the platform 320 to receive the outer ends of the mold sections when they are closed.

I claim as my invention:

1. In a glass-working machine, the combination with a movable table, molds comprising relatively movable parts carried by said table, a reciprocable table actuator, a primary air valve shifted by said actuator, a pneumatically operated secondary air valve controlled by the primary air valve, air-pressure motors controlled by the secondary valve, and connections between said air-pressure motors and the molds.

2. In a glass-working machine, the combination with a movable table, molds comprising relatively movable parts carried by said table, a reciprocable table actuator, a primary air valve shifted by said actuator, a pneumatically operated secondary air valve controlled by the primary air valve, an air-pressure motor controlled by the secondary valve, and connections between said air-pressure motor and a mold.

3. In a glass-working machine, the combination of a movable table, a plurality of molds carried thereby, shears arranged above the path of travel of the molds, a shear motor, a main control valve controlling the shear motor in both directions, means controlled by the shears on their opening stroke to operate a primary valve, the said primary valve, pneumatically operated secondary valves controlled by the primary valve, air-pressure motors connected to various moving parts of the machine, and connections between said secondary valves and said motors.

4. In a glass-working machine, the combination of a movable table, a plurality of molds carried thereby, shears arranged above the path of travel of the molds, a shear motor, a main control valve, means controlled by the shears on their opening stroke to operate a primary valve, the said primary valve, pneumatically operated secondary valves controlled by the primary valve, air-pressure motors connected to various moving parts of the machine, and connections between said secondary valves and said motors.

5. In a glass-working machine, the combination of a movable table, a plurality of molds carried by said table, shears arranged above the path of travel of said molds, a valve for controlling the shear motor, an arm for actuating said valve, means controlled by the shears on the opening stroke to operate a primary valve, said primary valve, pneumatically operated secondary valves controlled by the primary valve, and air-pressure motors connected to various moving parts of the machine and controlled by the secondary valve.

6. In a glass-working machine, the combination of a movable table carrying relatively movable parts, a table actuator and reciprocating air motor therefor, air-flow controlling means arranged to be actuated at opposite ends of the strokes of the table drive, air motors, connections between said motors and movable parts of the machine, pnuematically operated secondary valves for controlling said air motors, and air passages between said secondary valves and the air-flow controlling means.

7. In a glass-working machine, a neck-forming nipple having an interior air chamber and an outlet therefor, a piston carrying said chamber and provided with an air passage leading from a point intermediate in the length of the piston to the chamber of the nipple, whereby said air passage communicates with the interior of the cylinder of the piston when the nipple is in retracted position, the said cylinder, and air supply pipes for supplying air to reciprocate said piston.

8. In a glass-working machine, the combination of a rotary table, a blank mold unit carried by said table and comprising a blank mold carrier journaled on the table on a horizontal axis, a pair of mating blank mold sections hinged upon said carrier, an actuator movably mounted on said carrier and connected to the blank mold sections; means for engaging said actuator to shift the same in one direction as a result of table movement; other means for engaging said actuator to shift it in the opposite direction while the table is stationary; a blow mold unit mounted upon the table adjacent the blank mold unit and comprising a swinging carrier, mating blow mold sections mounted on said carrier, a cam track for supporting the blow mold carrier in its elevated position, a cam operating upon the blow mold sections during movement of the table to close said sections, a blow mold opener arranged adjacent the table to open the blow mold at discharging position, and an air motor for moving the blow mold carrier upwardly; and means for controlling the flow of air to said air motor.

9. In a glass-working machine, the combination of a rotary table, a swinging blow mold carrier hinged on said table, mating blow mold sections hinged on said carrier, a shiftable cross head mounted on said carrier and connected to the blow mold sections to actuate the same, a latch to hold said blow mold in open relationship, and an air pressure motor arranged in the path of travel of the cross head by rotation of the table, whereby said cross head may be moved into and out of registry with said air motor.

10. In a glass-working machine, the combination of a rotary table, a plurality of mold-actuating air motors mounted on said table and each provided with an air inlet bushing carried by the table, an air motor arranged adjacent the table and having a piston rod projectable into said bushings in succession, and air supply passages carried by the piston rod and its casing for establishing an air supply to the mold-actuating air motor when the piston rod is projected into a bushing.

11. In a glass-working machine, a mold carrier, a swinging mold member mounted thereon and movable at times under the action of gravity, a latch, and a member carried by the movable mold member for engagement by said latch to hold the mold member in place against the action of gravity.

12. In a glass-working machine, the combination of a rotary table, a swinging mold carrier hinged on said table and movable into and out of substantially horizontal position, a mold member movably mounted on said mold carrier, a latch carried by the mold carrier, and a member carried by the movable mold member for engagement by said latch whereby the movable mold member will be held against the action of gravity at times when the mold carrier is in an inclined position.

13. In a glass-working machine, the combination of a rotary table, a swinging mold carrier hinged on said table and movable into and out of substantially horizontal position, a separable mold and a mold opening and closing member movably mounted on said mold carrier, a latch carried by the mold carrier, and a member carried by the movable mold operating member for engagement by said latch whereby the movable mold operating member will be held against the action of gravity at times when the mold carrier is in an inclined position, and an air pressure motor arranged adjacent the path of travel of the mold carrier and provided with means for engaging the movable mold operating member to shift the same to bring its latch-engaged member into engagement with the latch.

14. In a glass-working machine, a rotary table, a mold carrier rotatively mounted on said table on an axis at an angle to the axis of the table, a movable mold member movably mounted on said carrier, a plunger mounted axially in said carrier and axially movable therein, connections between said plunger and the movable mold member, a stationary cam arranged to shift said plunger in one direction upon rotation of the table, and pneumatically-operated means for shifting the plunger in the opposite direction while the table is stationary.

15. In a glass-working machine, a mold carrier, a pair of coöperating mold members movable toward and from each other, a pair of coöperating neck ring mold members movable toward and from each other and having overlapping engagement, in one direction, with the mold members, an operating member connected with the neck ring mold members for shifting the same toward and from each other, a spring abutment to act upon said operating member to hold the neck ring mold members in coöperative relationship when the mold members are withdrawn, and means for bringing the operating member intermittently into engagement with said abutment.

16. In a glass-working machine, a rotary table, a rotary mold carrier journaled on said table at an angle to the axis of the table, a pair of mating mold members mounted upon the carrier and movable toward and from each other, an operating member for shifting said mating mold members, a pair of mating neck ring members mounted on the carrier and having overlapping engagement in one direction with the mold members, an operating member for the mating neck ring members, and a spring abutment arranged at a point in the path of travel of said last-mentioned operating member due to table rotation, for engaging and holding said operating member to retain the mating neck ring members in mating position subsequent to withdrawal of the main mold members.

17. In a glass-working machine, glass shearing means comprising a movable member, a primary pneumatically operated controlling member, an air supply line leading thereto, a controlling valve in said air line, means for normally holding said valve in one position, and a one-way cam carried by the movable shear member to act upon the air valve only upon movement of the movable shear member in one direction.

18. In a glass-working machine, the combination of a rotary mold carrying table, a swinging blow mold carrier hinged upon the table so that its free end may be swung up and down, blow mold members carried by said carrier, means for operating said blow mold members, a segmental track arranged in position to support the blow mold carrier in its elevated position, a latch arranged at the receiving end of said track to retain the carrier in its initial elevated position for entrance upon the track, and a cam carried by said track and arranged to engage the blow mold operating member to retain the blow mold in closed position.

19. In a glass-working machine, the combination of a rotary mold carrying table, a swinging blow mold carrier hinged upon the table so that its free end may be swung up and down, blow mold members carried by said carrier, means for operating said blow mold members, a segmental track arranged in position to support the blow mold carrier in its elevated position, and a latch arranged at the receiving end of said track to retain the carrier in its initial elevated position for entrance upon the track.

20. In a glass-working machine, the combination of a movable table, a movable mold carrier carried by said table and movable into and out of active position, movable mold members mounted upon said mold carrier, means for shifting said movable mold members into and out of mating relationship, and a stop arranged adjacent the position where the mold carrier is to be moved to active position, said stop having overlapping engagement with a member carried by a movable mold member when the mold members are in mating relationship, whereby movement of the mold carrier to active position is prevented unless the mold members are properly retracted from mating relationship.

21. In a glass-working machine, the combination with a blow head, means for moving said blow head into and out of active position, said means comprising a pneumatic operating member having a supply pipe provided with an inwardly-opening leaking check upon that side of the pneumatic operating means serving to withdraw the blow head from active position, and means for presenting articles to be blown to the active position of the blow head, whereby the blow head is cushioned in its application to the article by the air checked by said check.

22. In a glass-working machine, a swinging mold carrier movable to and from horizontal and inclined position, a pair of mating mold members pivotally mounted on an axis carried by said swinging carrier, a cross head connected to and operating said mold members, and a latch arranged to engage said cross head to retain the mold members in one position against the action of gravity.

23. In a glass-working machine, the combination of a blank mold comprising relatively movable mating members, a guard plate arranged to coöperate with the receiving end of said mold members, means for shifting said guard plate into and out of alinement with a mold cavity, clamping members for clamping the mold members in mating relation, said clamping members comprising a movable part, and means operated by said movable part for shifting the guard plate axially preliminary to opening movement of the mold members.

24. In a glass-working machine, the combination of mating mold members, a pair of clamping jaws arranged to clamp the mold members in mating relation, a guard plate laterally and axially movable coöperatively with the receiving end of the blank mold, means for shifting the guard plate laterally, an axially movable carrier for said guard plate, and means carried by a movable member of the clamp for engaging said carrier and shifting the same preliminary to an opening movement of the blank mold members.

25. In a glass-working machine, the combination of a rotary table carrying a plurality of molds, each comprising mating members movable toward and from each other, a pair of clamping means arranged to simultaneously engage two of such molds to hold their parts in mating relationship, and a single pneumatically-controlled operating member acting simultaneously upon said two clamping members.

26. In a glass-working machine, a cavity-forming nipple comprising a main shank, a nipple mounted loosely upon said shank, and a retaining ring mounted upon the shank and loosely engaging the nipple to hold the same in general position, said nipple having a portion formed to coöperate with a mold member to center the same.

27. In a glass-working machine, a cavity forming nipple comprising a main shank having an air supply passage, a nipple mounted upon the end of said shank, and having the internal chamber communicating with the air passage of the main body and provided with lateral outlets, and a retaining ring mounted upon the main body and loosely engaging the nipple to hold the same in general place.

In witness whereof I have hereunto set my hand at Columbus, Ohio, this first day of August, A. D. one thousand nine hundred and seventeen.

EDWARD MILLER.